July 8, 1952
C. A. GESNER
2,602,655
MULTIPLE GOVERNOR WITH COMMON SERVO
Filed Dec. 2, 1949
2 SHEETS—SHEET 1
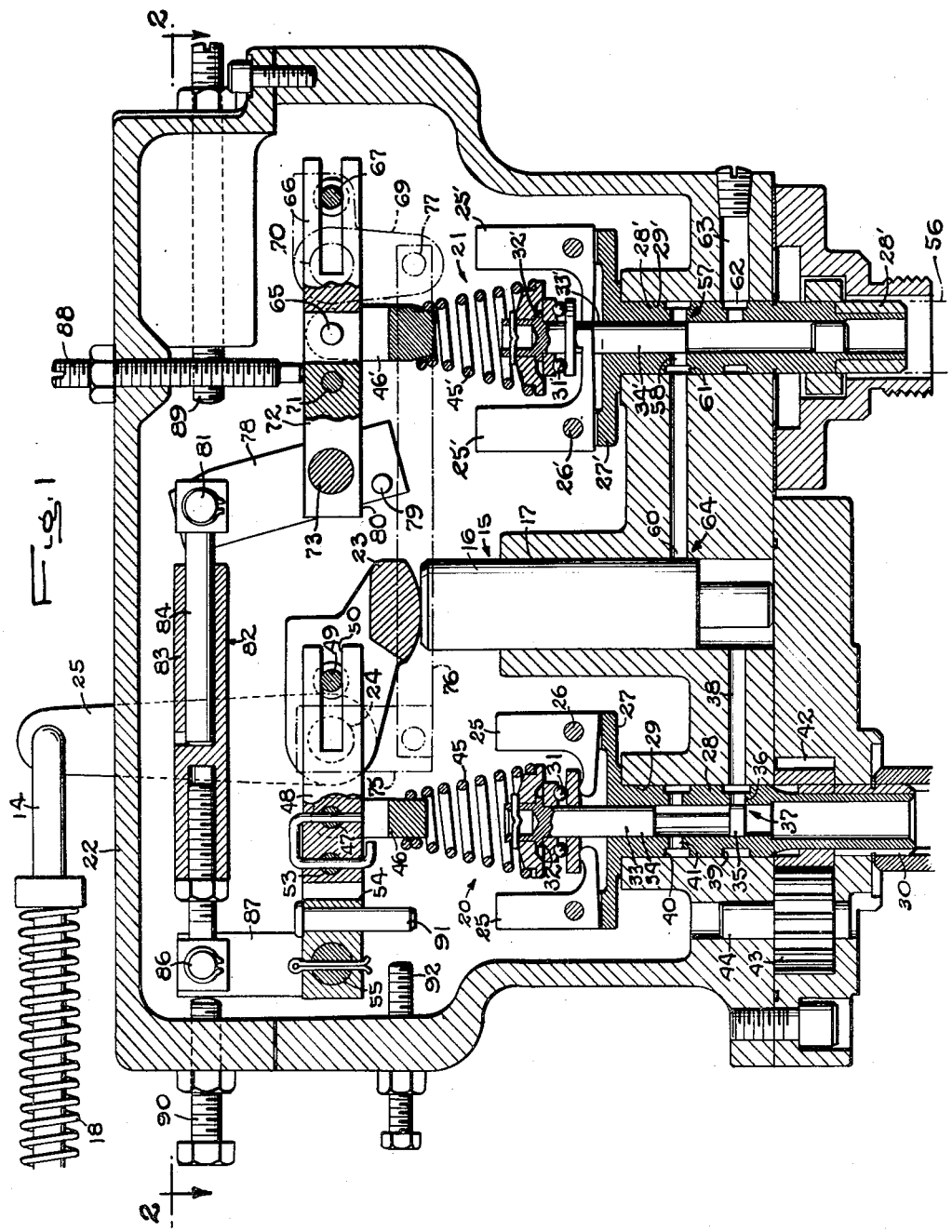
INVENTOR
Clyde A. Gesner
By Carlson, Pitzner, Hubbard & Wolfe
ATTORNEYS July 8, 1952  C. A. GESNER  2,602,655
MULTIPLE GOVERNOR WITH COMMON SERVO
Filed Dec. 2, 1949  2 SHEETS—SHEET 2
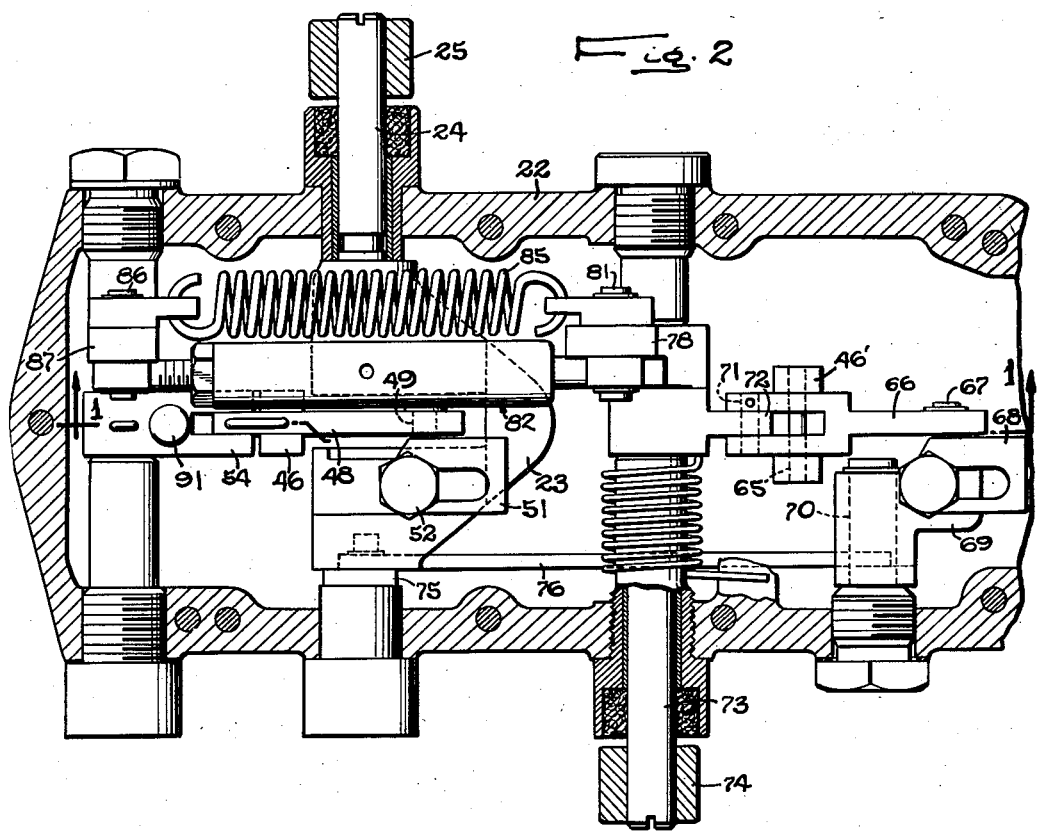
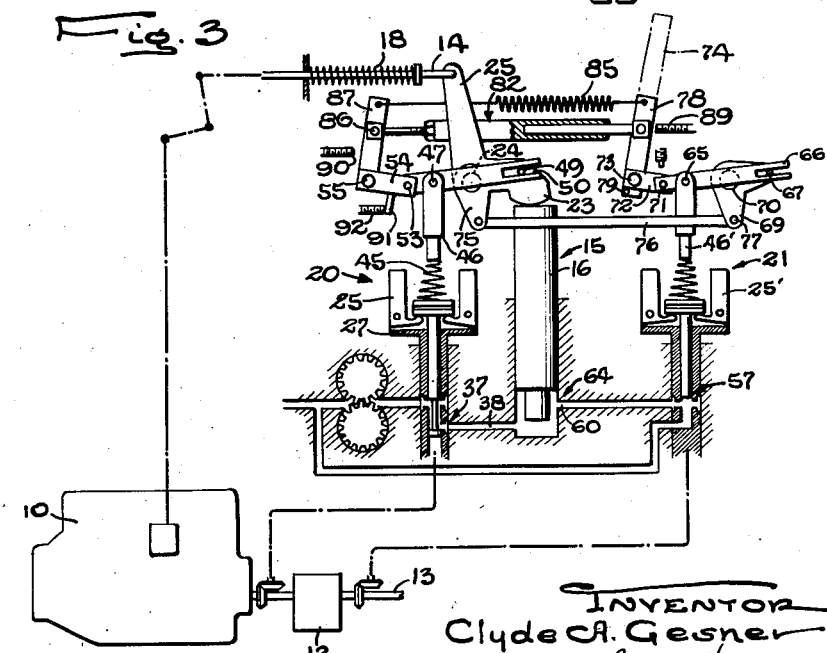
INVENTOR
Clyde A. Gesner Patented July 8, 1952

2,602,655

UNITED STATES PATENT OFFICE 2,602,655

MULTIPLE GOVERNOR WITH COMMON SERVO

Clyde A. Gesner, Rockford, Ill., assignor to Woodward Governor Company, Rockford, Ill., a corporation of Illinois Application December 2, 1949, Serial No. 130,650

6 Claims. (Cl. 264—7)

This invention relates to a speed regulator of the type in which two separately driven speed governors act jointly to control the action of a power servo in positioning a regulating member controlling the delivery of an energy medium to a prime mover.

One object is to provide a duplex speed regulator of the above character which operates in response to speed changes not only of the prime mover but also of the output shaft of a transmission having an automatically variable drive ratio.

Another object is to provide a novel mechanism for insuring stability in the operation of both of the governors of the speed regulator.

A more detailed object is to vary the position of a power actuated servo by the joint action of two separately driven governors, the actions of which are modified automatically in accordance with the position changes of the single servo as to the impart speed droops of different selected values to the respective governors.

Another object is to adapt the two governors, when controlling a prime mover and automatic transmission, for speed adjustment in a novel manner by a single manually movable member.

A further object is to provide for disabling of the dual governor control automatically under certain conditions arising in service use.

Other objects and advantages of the invention will become apparent from the following detailed description taken in connection with the accompanying drawings, in which Figure 1 is a vertical sectional view of a speed regulator embodying the present invention, the section being taken along the line 1—1 of Fig. 2.

Fig. 2 is a section taken along the line 2—2 of Fig. 1.

Fig. 3 is a schematic view of the regulator as applied to a prime mover-torque converter combination.

While the invention is susceptible of various modifications and alternative constructions, I have shown in the drawings and will herein describe in detail the preferred embodiment. It is to be understood, however, that I do not intend to limit the invention by such disclosure but aim to cover all modifications and alternative constructions falling within the spirit and scope of the invention as expressed in the appended claims.

As shown in the drawings, the invention is incorporated for purposes of illustration in a duplex governor for controlling the supply of fuel to a prime mover or internal combustion engine 10 whose shaft 11 is coupled to the input shaft of a so-called torque converter 12 having an output shaft 13. The torque converter may be of the fluid type and adapted to transmit the motion of the shaft 13 at a ratio which varies automatically with changes in the load on this shaft.

To vary the fuel supply to the engine, the fuel rod 14 thereof is arranged to be actuated by a power servo 15 which as shown may comprise a piston 16 slidable in a cylinder 17 and urged in the fuel-decreasing direction by a spring 18. Energization of the servo or the flow of pressure fluid to and from the cylinder 17 thereof is controlled by the joint action of two speed-sensing devices or governors 20 and 21 respectively driven in unison with the prime mover shaft 11 and the output shaft 13 of the torque converter. Herein, both governors are housed in a casing 22 also containing the servo cylinder 17 from which the piston 16 projects upwardly and bears at its upper end against an arm 23 fast on a shaft 24. The latter is journaled in and projects outwardly from the casing and carries an arm 25 connected to the fuel rod linkage 14.

Considering first the governor 20, flyballs 25 are pivoted at 26 on a ball head 27 fast on the upper end of a sleeve 28 journaled in a bore 29 of the casing and splined at its lower end 30 for connection with the engine shaft 11. Horizontal arms on the flyballs bear upwardly against the lower race ring of an antifriction thrust bearing 31 whose upper ring abuts against a flange 32 on a rod 33 having an upper elongated land 34 which reciprocates in the bore of the sleeve 28. At its lower end, the rod 33 carries a land 35 which cooperates with ports 36 through the sleeve to form a valve 37.

The valve 37 constitutes the control device of the governor 20 and operates to regulate the flow of pressure fluid or oil to and from the lower end of the servo cylinder 17 through a passage 38. One end of the latter opens into a groove 39 extending around the sleeve 28 and communicating with the ports 36. When the land is raised above the ports in response to a speed increase above the speed setting of the governor 20, oil is permitted to flow from the cylinder 17 out through the lower end of the sleeve 28. Lowering of the land below the neutral position shown in Fig. 1 permits pressure fluid delivered through a sleeve groove 40 and ports 41 to flow into the servo.

Fluid at a substantially constant pressure may be supplied to the groove 40 by a pump comprising gears 42 and 43 in a recess formed in this casing 22 and having inlet and outlet openings communicating respectively with a sump within the casing. One gear 43 rotates on a stud 44 while the other gear is splined on the lower end portion of the sleeve 28.

The tendency of the flyballs 25 to move outwardly and lift the valve land 35 is counteracted by a speeder spring 45 of the compression type acting between the upper end of the valve rod 33 and a yoke 46 depending from a pivot pin 47 on a lever 48 and anchored in the upper end of the speeder spring coil. The lever 48 is disposed horizontally, and, for a purpose to appear later, is fulcrumed on a pin 49 which projects through a slot 50 in the lever and is mounted on the servo actuated arm 23 through the medium of a slotted bracket 51 adjustable along the top of the arm and clamped to the latter by a screw 52. The other end of the lever 48 is pivotally connected by a pin 53 to the forked free end of a bell crank arm 54 fixed to a rockshaft 55 which is journaled at opposite ends in the walls of the casing 22. Rocking of the shaft 55 clockwise as viewed in Fig. 1 swings the lever 48 about the fulcrum 49 and compresses the speeder spring 45 thereby increasing the speed setting of the governor 20 that is, the speed of the engine at which the land 35 covers the ports 36.

The governor 21 is of the same general construction as the governor 20, and the corresponding parts are indicated by similar but primed reference numerals. The drive sleeve 28' of this governor is coupled at its lower end to a suitable drive connection 56 rotatable with the output shaft 13 of the torque converter 12. Control of the energization of the servo 15 by this governor is effected in the present instance by utilizing a valve 57 formed by the upper land 34' and coacting sleeve ports 58 to by-pass fluids out of the cylinder 17. For this purpose, a passage 59 leads from an outlet port 60 in the servo cylinder 17 to the sleeve bore 29' at a point opposite a groove 61 which surrounds the sleeve ports 58. Outlet ports 62 in the sleeve communicate with surrounding grooves and the end of a return passage 63 leading back to the sump or pump inlet. It will be seen that when the speed of the torque converter shaft 13 rises above the speed setting of the governor 21 as determined by the stress of the speeder spring 45', the land 34' will be raised above the ports 58 thereby opening the valve 57 to permit the escape of pressure fluid from the servo cylinder 17. At lower speeds, the valve 57 will be maintained closed and no fluid will be by-passed out of the servo cylinder.

In one of its aspects, the invention contemplates the provision of means for disabling the torque converter governor 21 and preventing the latter, under certain conditions which may arise in service, from so reducing the fuel supply as to cause stoppage of the engine. This means comprises a valve 64 which is open under normal operating conditions but which is closed automatically as an incident to a reduction in the fuel supply to a predetermined value. Herein, the valve is formed by the port 60 coacting with the lower end portion of the servo piston 16. Thus, the port is located a short distance above the lower end of the piston in the engine idling position of the latter shown in Fig. 1. At higher engine speeds (see Fig. 3), the port will be uncovered thereby permitting the escape of pressure fluid from the servo as determined by the action of the governor actuated by-pass valve 57.

The speed adjusting yoke 46' of the governor 21 is pivoted at 65 on a horizontal lever 66 forked at one end and straddling a fulcrum pin 67 which is supported on a slotted plate 68 adjustably clamped to a rocker arm 69 journaled on a stud 70 which projects inwardly from the wall of the casing. The other end of the lever 66 is forked and pivotally connected by a pin 71 to the free end of an arm 72 loose on a rockshaft 73 which is journaled in the casing walls with one end projecting outwardly and carrying the main speed adjusting arm 74 of the two governors. As in the case of the engine governor 20, the stress of the speeder spring 45' and therefore the setting of the torque converter governor 21 will be increased when the lever 72 is rocked clockwise as viewed in Fig. 1.

In accordance with the present invention, proper correlation of the two governors 20 and 21 in their joint control of the single servo 15 is achieved by imparting to both governors a speed droop characteristic which differs in magnitude in the different governors but which is derived from the motion of the single servo. To this end, the servo motion is tranmitted back to each governor and thereby used to vary the stressing of the speeder spring thereof progressively as the servo piston moves back and forth. Herein, the restoring connection for the engine actuated governor 20 is formed by the speed adjusting lever 48 simply by mounting the fulcrum pin 49 as described above directly on the rocker arm 23 of the servo 15 and in a position such that the upward or fuel-increasing movement of the servo piston 16 will swing the lever 48 in a direction to reduce the stress of the speeder spring 45. In this motion, the pin 53 at the end of the manually operable speed adjusting arm 54 acts as the fulcrum for the lever 48. Also, to enable the amount of the speed droop thus imparted to the governor 20 to be varied in magnitude, the fulcrum pin 49 is adjustably mounted as above described so that it may be shifted to different positions along the forked end of the lever 48 thus varying the ratio of transmission of the restoring or speed droop producing motion.

To impart speed droop to the torque converter governor 21, the servo motion is transmitted through a linkage including a depending arm 75 fast on the servo actuated fuel control shaft 24 and connected at its free end to one end of a link 76. The other end of the latter is pivoted at 77 on the lower end of the bell crank 69 which is swingable about the fixed pivot 70 to correspondingly swing the lever 66. By adjusting the fulcrum pin 67 along the lever 66, the ratio of the lever is changed and the magnitude of the speed droop of the governor 21 varied correspondingly.

Provision is also made for effecting speed adjustment of both of the governors 20 and 21 by manipulation of a single manually operable member such as the arm 74 which as described above is fast on the outer end of the rockshaft 73. Within the casing, an upwardly projecting lever 78 is fast on the shaft 73 and at its lower end has a lost motion connection with the speed adjusting lever 72 for the governor 21. This connection is formed by a laterally projecting pin 79 which, after a predetermined clockwise swinging of the lever 78, engages the under side of the lever 72 at a point 80 and, in the further movement of the lever, rocks the lever 72 about the shaft 73 to increase the compression of the speeder spring 45'.

The upper end of the lever 78 is pivotally connected at 81 to one end of a longitudinally extensible link 82 formed by telescoping parts 83 and 84 and normally contracted by a tension spring 85. The other end of the link 82 is pivoted at 86 on the upper end of an arm 87 upstanding from and fast on the speed adjusting rockshaft 55 above described of the governor 20.

The low speed setting of the torque converter governor 21 is determined by an adjustable stop 88 threading through the cover of the casing 22 and engageable at its inner end with the lever 72. A similar screw 89 is positioned at its inner end to engage with the end of the lever 78 and limit the speed-increasing movement of the lever 72 after the slack in the lost motion connection between the levers 72 and 78 has been taken up. A screw 90 engageable with the other end of the link 82 limits the low speed setting of the engine governor 20. The high speed setting of the latter governor is limited by engagement of a pin 91 on the lever 54 with the inner end of a screw 92.

Operation

Let it be assumed that the governors 20 and 21 driven by the idling engine and torque converter shafts as above described are adjusted for the minimum speeds and that the engine is running at idle speed. The parts will then be positioned as shown in Fig. 1, the link 82 then being collapsed and the pin 79 being spaced from the lever 72. At the same time, the servo piston 17 will be in its lowermost position closing the valve 64 so as to maintain the governor 21 disabled. As the adjusting arm 74 is swung clockwise, the link 82 will be held collapsed by the spring 85 and the arm 87 will be swung away from the stop 90 to increase the speed setting of the governor 20. This opens the valve 37 against the action of the flyballs 25 admitting pressure fluid to the servo and correspondingly increasing the fuel flow and engine speed. In the initial upward movement of the servo piston 16, the valve may be opened rendering the governor 21 operative. If there is no load on the torque converter, the engine, operating at the increased speed, may increase the speed of the output shaft 13 above the minimum speed setting of the governor 21. The latter then exercises a superior control over the servo 15 by opening the valve 57 and allowing pressure fluid to be by-passed out of the cylinder 17 thus limiting the extent of fuel-increasing movement of the servo. This condition is illustrated in Fig. 3.

On the other hand, if a substantial load is imposed on the shaft 13, the increase in the fuel supply and engine torque may not be sufficient to pick up the load and increase the speed of the output shaft above the minimum setting of the governor 21. Thus, the fuel supply to the engine may be increased further without bringing the governor 21 into action. If the load is sufficiently heavy, the speed setting of the engine governor may be increased by further clockwise swinging of the hand lever 74 until the projection 91 on the lever 54 comes against the stop 92, the engine actuated governor then being set for its maximum speed. At this time, the lost motion between the adjusting linkage and the lever 72 will have been taken up, and further clockwise turning of the hand lever 74 will be permitted by extension of the link 82 and will result in compression of the speeder spring 45' to correspondingly increase the speed setting of the governor 21, or, in other words, the speed at which it is desired to maintain rotation of the output shaft 13.

The governor 21, now being in exclusive control of the servo, except for engine overspeed, opens and closes the by-pass valve 57 as the speed of the shaft 13 rises above or falls below the prevailing speed setting. If, for example, the speed rises above such setting, the release of fluid from the servo cylinder will reduce the fuel supply and the engine speed may fall below the maximum speed for which the governor 21 is then set. As a result of such automatic control action together with the automatic response of the torque converter 12 to load changes, the speed of the output shaft 13 will remain substantially constant and at the selected setting of the governor 21 in spite of changes in the load up to the value capable of being handled by the engine when operating at its maximum speed. Thus, a drag line or shovel driven from the shaft 13 may be moved at constant speed in spite of variations in loading and as a result the capacity of the machine may be increased.

Now, if the speed setting of the governor 21 is reduced to the minimum value determined by the stop 88 and the setting of the governor 20 is reduced below the value required to maintain the minimum speed of the output shaft 13, control of the servo 15 is returned to the engine actuated governor 20. Under this condition, it is possible, by adjustment of the governor 20, to cut down the fuel delivery sufficiently to just balance the torque required to hold the load stationary. Such action is often desirable in material loading and unloading operations.

It will be apparent from the foregoing that with the duplex control described above, the engine fuel supply may be controlled exclusively either by the action of the engine actuated governor 20 or by the governor 21 or by the joint action of the two governors. The action selected is within the control of the operator and thus the combined engine and torque converter unit may be adapted for automatic operation under a larger number of operating conditions than has been possible heretofore. Moreover, the operation of the automatic control, whether by one of the governors or by both, is inherently stable by virtue of the drooping characteristics imparted to both governors by the restoring connections described above.

The mechanism herein shown for adjusting the speed setting of the two governors from the single lever 78 forms the subject matter of a copending application of George Parker, Serial No. 184,781, filed September 14, 1950.

I claim as my invention:

1. A duplex governor having, in combination, a fluid pressure servo having a piston element movable back and forth in accordance with pressure changes in the servo, means providing a source of fluid under pressure, a valve controlling the flow of fluid from said source to said servo, a speed-sensing device adapted to be driven from one source of rotary power and operable to actuate said valve and vary the energization of said servo in accordance with detected speed changes, a by-pass valve controlling the escape of pressure fluid from said servo, a second speed-sensing device adapted to be driven from a separate source of rotary power and operable to open and close said by-pass valve in accordance with detected changes, a connection between said piston element and said first device for varying the speed setting of the device progressively with changes in the position of the element, and a similar connection between said second speed sensing device and said element to vary the setting thereof progressively with changes in the element position.

2. Speed regulating apparatus having, in combination, a fluid pressure servo having a movable piston element, means providing a source of pressure fluid, two valves coacting jointly to control the flow of pressure fluid from said source to and from said servo and thereby variably position said piston element, a speed sensing device for actuating one of said valves adapted to be driven from one source of rotary power and having a selectively movable speed adjusting member, a second speed sensing device for actuating the other valve adapted to be driven from a separate source of rotary power and having a selectively movable speed adjusting member, and connections between said piston element and each of said speed adjusting members and operable to transmit the movements of said element to each of said members to impart speed droop characteristics thereto.

3. Speed regulating apparatus having, in combination, a fluid pressure servo having a movable driven element, two control devices coacting jointly to control the energization of said servo and thereby variably position said element, a speed senser for actuating one of said control devices adapted to be driven from one source of rotary power and having a selectively movable speed adjusting member, a second speed senser for actuating the other of said control devices adapted to be driven from a separate source of rotary power and having a selectively movable speed adjusting member, and connections between said servo element and each of said speed adjusting members and operable to transmit the movements of the element to each of said members to increase and decrease the speed settings thereof progressively with the speed-decreasing and speed-increasing movements respectively of the servo element.

4. Speed regulating apparatus having, in combination, a power actuated servo having a movable element, independently operable control devices coacting jointly to control the energization of said servo and thereby variably position said servo element, a speed governor for actuating one of said control devices and adapted to be driven from one source of rotary power, a second speed governor for actuating the other of said devices and adapted to be driven from a separate source of rotary power, mechanisms individually operable to impart speed drooping characteristics to the respective governors, and connections operable to actuate both of said speed droop mechanisms in accordance with the changing position of said servo element.

5. A duplex governor having, in combination, a fluid pressure servo having a cylinder and a piston element movable back and forth therein in accordance with changes in the energization of the servo, said piston being movable away from a predetermined idle position in response to an increase in the servo energization, means providing a source of fluid under pressure, a valve controlling the flow of fluid from said source to said servo, a speed-sensing device adapted to be driven from one source of rotary power and operable to actuate said valve and vary the energization of said servo in accordance with detected speed changes, a fluid passage terminating in a port in the wall of said cylinder, said port being covered by said piston in said idle position and opened after a predetermined speed-increasing movement of the piston, a second valve controlling the escape of pressure fluid from said passage, and a second speed-sensing device adapted to be driven from a separate source of rotary power and operable to open and close said second valve in accordance with detected changes.

6. A duplex governor having, in combination, a fluid pressure servo having an element movable back and forth in accordance with changes in the energization of the servo, means providing a source of fluid under pressure, a valve controlling the flow of fluid from said source to said servo, a speed-sensing device adapted to be driven from one source of rotary power and operable to actuate said valve and vary the energization of said servo in accordance with detected speed changes, a by-pass valve controlling the escape of pressure fluid from said servo, a second speed-sensing device adapted to be driven from a separate source of rotary power and operable to open and close said by-pass valve in accordance with detected changes, and a third valve actuated in response to changes in the position of said servo element and operable to maintain said by-pass valve disabled when the servo element is near said idle position while rendering the by-pass valve operative in other positions of the element.

CLYDE A. GESNER.

REFERENCES CITED

The following references are of record in the file of this patent:

UNITED STATES PATENTS

| Number | Name | Date |
|---|---|---|
| 2,324,516 | Kalin | July 20, 1943 |
| 2,364,115 | Whitehead | Dec. 5, 1944 |
| 2,411,290 | Pontius | Nov. 19, 1946 |
| 2,503,362 | Sweet | Apr. 11, 1950 |